United States Patent [19]

Bekki et al.

[11] Patent Number: 4,906,534
[45] Date of Patent: Mar. 6, 1990

[54] COMPOSITE ALUMINUM THIN PLATES FOR BRAZING AND METHOD FOR PREPARING SAME

[75] Inventors: Yoichiro Bekki, Fukui; Shigenori Asami, Nikko; Kazunori Ishikawa, Nikko; Takeyoshi Doko, Nikko; Eiji Itaya, Nikko, all of Japan

[73] Assignee: Furukawa Aluminum Co., Ltd., Tokyo, Japan

[21] Appl. No.: 283,315

[22] Filed: Dec. 9, 1988

Related U.S. Application Data

[63] Continuation-in-part of Ser. No. 262,234, Oct. 21, 1988, abandoned, which is a continuation of Ser. No. 56,729, Jun. 2, 1987, abandoned.

[30] Foreign Application Priority Data

Jun. 4, 1986 [JP] Japan .................. 61-128176
Sep. 12, 1986 [JP] Japan .................. 61-214069

[51] Int. Cl.$^4$ .................. B32B 15/20; C22F 1/053
[52] U.S. Cl. .................. 428/654; 148/11.5 A; 148/11.5 Q; 148/416; 420/531
[58] Field of Search .................. 148/11.5 A, 11.5 Q, 148/415, 416; 428/654; 420/531, 540

[56] References Cited

U.S. PATENT DOCUMENTS 4,150,980 4/1979 Imaizumi et al. .................. 420/540
4,357,397 11/1982 Baba et al. .................. 428/654

FOREIGN PATENT DOCUMENTS

33346 2/1985 Japan .................. 148/11.5 A
60-211056 10/1985 Japan .

Primary Examiner—Robert McDowell
Attorney, Agent, or Firm—Birch, Stewart, Kolasch & Birch

[57] ABSTRACT

Aluminum thin plates which are used as fins of a heat exchanger can be manufactured, as described in the claims, by controlling the composition of an aluminum alloy, which is used as a core material, and controlling the cold rolling reduction ratio of a clad material composed of the core material and a skin material, after hot rolling. The thus manufactured aluminum thin plates for brazing are excellent in high-temperature sagging resistance and sacrificial anodic effect, whereby it is possible to make the fins thinner.

5 Claims, 2 Drawing Sheets

COMPOSITE ALUMINUM THIN PLATES FOR BRAZING AND METHOD FOR PREPARING SAME

This is a continuation-in-part application of U.S. Patent Application Ser. No. 262,234 filed on Oct. 21, 1988 abandoned which is a continuation of Ser. No. 056,729 filed June 2, 1987 abandoned.

BACKGROUND OF THE INVENTION (1) Field of the Invention

This invention relates to aluminum thin plates for fins of condensers and the like which are excellent in sagging resistance at high temperature and which are suitable for non-corrosive flux brazing and carrier gas brazing, and a method for preparing the same.

(2) Description of the Prior Art

Heretofore, heat exchangers made from aluminum alloys which can be used as condensers for automotive coolers, evaporators and the like have been constituted by extruded multi-hole tubes (perforated tubes) and corrugated fins.

In general, the extruded multi-hole tube may be manufactured from A1050 (According to Japan Industrial Standard. The same rule applies hereinafter) which contains 99.5 wt % or more of Al (the unit "wt %" will be hereinafter and in claims referred to simply as "%") or an A3003 alloy (Al-0.15% Cu-1.1% Mn), and the corrugated fin may be manufactured from a so-called brazing sheet in which A3003 or A3203 (Al-1.1% Mn) as a core material is clad on both the surfaces thereof with an Al-Si alloy such as A4343 (Al-7.5% Si) or A4004 (Al-10% Si-1.5% Mg) as a brazing material.

Usually a standard cladding ratio of the brazing material on the core material is within the range of 8 and 13% on either surface thereof, and a total thickness of each fin plate is about 0.16 mm.

The heat exchanger in which the brazing sheets are employed may generally be manufactured in accordance with a so-called brazing method of heating the extruded multi-hole tubes and the brazing sheets up to a temperature of 590° to 620° C. for several minutes in order to bond them. In this case, for the purposes of disrupting oxide layers on the surfaces of the brazing material and accelerating the flow of a solder, two methods are mainly put into practice, and one is a furnace brazing process in which a flux consisting of chloride is employed and another is a vacuum brazing process in which an Mg evaporation effect (a getter function) is utilized.

As a measure to reduce manufacturing cost of the heat exchangers, it can be conceived to make their materials thin and light, that is, in this case, to render the tubes and fins thin. With regard to the tubes, their wall thickness has been from about 1 to about 1.2 mm in former days, but owing to subsequent researches, the tubes having a wall thickness of about 0.5 to about 0.6 mm are put into practice in recent years.

However, with regard to the fins, their wall thickness remains unchanged, and thus it is within the range of 0.16 to 0.2 mm. In short, the minimum wall thickness of the fins is still on the level of 0.16 mm. The reason for this is as follows: In manufacturing the heat exchanger, the fins are heated at a high temperature of 590° to 620° C., as described above, and as a result, a brazing material clad on the surfaces of the fins is melted. And the melted solder is further diffused up to the core material of the fins, so that the high-temperature strength of the fins falls down, with the result that the fins cause sagging, in other words, a so-called sagging phenomenon occurs. For this reason, the conventional brazing sheets are not satisfactory in point of the wall thickness.

As for the brazing sheets used in the non-corrosive flux brazing process using a fluoride containing flux or the carrier gas brazing process of brazing techniques, it is necessary to add Zn to such a core material of the corrugated fins (or both the core material and the brazing material as the skin material) as the A3003 alloy in order to provide the core material with an effect as sacrificial anodic fins and to thereby protect the extruded tube material from corrosion. However, the addition of Zn lowers the high-temperature sagging resistance, though the sacrificial anodic effect can be enhanced.

Further, in the carrier gas brazing process, if the diffusion of the skin material is vigorous, Zn in the core material will evaporate therefrom, so that the remaining Zn amount in the fins will be insufficient to attain the sacrificial anodic effect expected.

In addition, there has presently been suggested a novel method for manufacturing a fin material for an aluminum alloy heat exchanger by the use of the brazing technique (Japanese Patent Application (OPI) No. 215,729/1985), and according to this new method, the fin material can be manufactured in which an aluminum alloy core material containing predetermined amounts of Mn, Mg and Zr is clad with a skin material.

In the method disclosed in the gazette of Japanese Patent Application (OPI) No. 215,729/1985 above referred to, it is contemplated to heighten the sagging resistance by adding Zr to the fin material and carrying out one annealing step as an intermediate treatment of a predetermined cold rolling. In recent years, however, a required level of the high-temperature sagging resistance of the brazing sheets is getting higher, as the fin material is thinned, and therefore the above suggested method is too poor to satisfy the enhanced requirements.

Further, in the non-corrosive flux brazing process or the carrier gas brazing process, the Zn component is added to the core material, as described above, but the thus obtained conventional brazing sheets are low in high-temperature sagging resistance, and the requirement for rendering the fin material thin, cannot be satisfied.

SUMMARY OF THE INVENTION

An object of this invention is to provide a method for preparing aluminum alloy thin plates which scarcely sag by brazing at a high temperature, in other words, which are excellent in high-temperature sagging resistance.

Another object of this invention is to provide a method for preparing aluminum thin plates for brazing which show an excellent sacrificial anodic effect for extruded multi-hole tubes.

A still another object of this invention is to provide a method for preparing aluminum thin plates for brazing which are particularly suitable for a non-corrosive flux brazing process and a carrier gas brazing process.

A further object of this invention is to provide an inexpensive aluminum thin plate material which can be manufactured by using an aluminum alloy containing a pretty amount of Fe.

A still further object of this invention is to provide an aluminum alloy fin material for heat exchangers which can be thinned and which scarcely sags by brazing at a high temperature, in other words, which is excellent in high-temperature sagging resistance.

Still other objects and advantages of this invention will be apparent from the following description.

The inventors of this application have conducted various experiments intensively, and as a result they have found the following:

In manufacturing a clad material in which a core material of an aluminum alloy containing predetermined amounts of Mn, Zn and Cu and containing controlled amounts of Fe and Si is clad with a skin material of an Al-Si system or an Al-Si-Mg system brazing material, annealing is carried out immediately after hot rolling or after cold rolling, but for the purpose of improving the high-temperature sagging resistance, the following two points are important: The first important requirement is that at least two intermediate full annealing steps are necessary, and the second requirement is that with regard to the last two intermediate full annealing steps in the annealing process, cold rolling reduction ratio should be taken into consideration. The inventors of this case have investigated these requirements in detail and have finally found that it is necessary to control reduction ratios in the cold rolling process and the annealing process under certain conditions. This invention has been achieved on the basis of this finding.

DETAILED DESCRIPTION OF THE INVENTION

A preferable embodiment of a method for preparing brazing sheets for fins of heat exchangers from an aluminum alloy core material comprising 0.6 to 2.0 wt % of Mn, 0.3 wt % or less of Fe, 0.05 to 0.6 wt % of Si, 0.5 to 2.0 wt % of Zn, 0.05 to 0.2 wt % of Cu and a balance of Al, and skin materials of an Al-Si system or an Al-Si-Mg system to be clad on both the surfaces of the core material comprising the steps of (1) hot rolling the combined said core material and said skin materials which are laid on the both surfaces of the core material after or without heating said core material at a temperature of 580° C. or below for homogenization, and (2) conducting cold rollings and intermediate full annealings to obtain a final cold rolled brazing sheet, wherein (a) at least two intermediate full annealings are carried out, and (b) said cold rollings are carried out in such rolling reduction ratios that a cold rolling reduction ratio $R_1(\%)$ of from the second last intermediate full annealing to the last intermediate full annealing and another cold rolling reduction ratio $R_2(\%)$ of from the last intermediate full annealing to the last thickness of said clad material satisfy the following relationship:

$$10 \leq R_1 \leq 90 \text{ and } 10 \leq R_2 \leq 60, \text{and}$$

$$30 \leq (R_1 + R_2) \text{ and } (R_1 - R_2) \leq 60.$$

This embodiment will be hereinafter referred to as the first method.

The reason why in the first method, the aluminum alloy elements of the core material and their amounts are restricted as described above is as follows:

The amount of Mn to be added is within the range of 0.6 to 2.0%. The Mn element functions to enhance the strength of the alloy, taking part in the formation of fine scale Al-Mn-Fe precipitates or Al-Mn-Si precipitates, contributing to the formation of coarse recrystallized grains, and improving high-temperature sagging resistance of the core material for the high-temperature heating treatment in the brazing step. When the amount of Mn is less than 0.6%, its effects are insufficient, and when it is in excess of 2.0%, a gigantic crystal tends to occur therein. A moldability as the fin material deteriorates.

The amount of Fe is 0.3% or less. The Fe element takes part in the precipitates of the Al-Mn-Fe particles, contributes to the formation of coarse recrystallized grains, and improve the high-temperature sagging resistance of the core material for the high-temperature heating treatment in the brazing step.

The amount of Si to be added is within the range of 0.05 to 0.6%. The Si element takes part in the fine precipitates of the Al-Mn-Fe particles, contributes to the formation of coarse recrystallized grains, and improve the high-temperature sagging resistance of the core material for the high-temperature heating treatment in the brazing step. When the amount of Si is less than 0.05, its effects are insufficient, and when it is more than 0.6%, the recrystallized grains inversely become fine owing to an effect of precipitates, so that the high-temperature sagging resistance become poor.

The amount of Zn is within the range of 0.5 to 2.0%. The Zn element has functions of rendering negative an electric potential of the fin material and preventing the pitting corrosion of working fluid paths such as the tubes by a sacrificial anodic effect. When the amount of Zn is less than 0.5%, the above functions are insufficient, and when it is more than 2.0%, self-corrosion becomes perceptible and the soldering property deteriorates.

In the first method, Cu may be added in such a small amount as within the range of 0.05 to 0.2%, although there is no need to positively add it. The Cu element had been considered to be undesirable because of rendering positive the electric potential of the fins to the extruded tube. However, as a result of various investigations by the inventors, it has been found that when the amount of Fe is limited to a level of 0.3% or less, the addition of Cu is effective to improve the high-temperature sagging resistance. The fins containing a small amount of Cu are different in the high-temperature sagging resistance from an alloy not containing Cu. In the fin material containing Cu, consequently, requirements differ a little, which are, for example, the cold rolling reduction ratio of from the second last intermediate full annealing to the last intermediate full annealing, the range of the last cold rolling reduction ratio, and the set number of the intermediate full annealing.

That is, in the case that the amount of Fe is small, an Al-Fe-Cu system crystallized material containing Cu is formed in a small amount at the time of casting, and most of Cu is dissolved in a matrix. In the subsequent heat treatment process, the Cu element is consumed for the formation of an Al-Cu-Mn system precipitate, so that the amount of the dissolved Mn element decreases. Accordingly, the recrystallization may occur smoothly in the subsequent high-temperature step, whereby the high-temperature sagging resistance can be built up.

When the amount of Cu is less than 0.05%, such an effect as described above is unsatisfactory. However, when the amount of Cu is in excess of 0.2%, the potential of the fins becomes positive and the sacrificial anodic effect to the extruded material deteriorates.

In the first method, the main components of the aluminum alloy which is the core material are as mentioned above, but this alloy may additionally contain other elements (Mg, Cr, Ti, B, Zr, Ca, Li and the like) for the formation of the fine crystalline grains at casting, in so far as each content of these elements is an amount of 0.05% or less, since such a content level has no influence on the effect of this invention.

Another preferable embodiment of a method for preparing brazing sheets for fins of heat exchangers from an aluminum alloy core material comprising 0.6 to 2.0 wt % of Mn, 0.31 to 0.80 wt % of Fe, 0.05 to 0.6 wt % of Si, 0.5 to 2.0 wt % of Zn, 0.05 to 0.2 wt % of Cu and a balance of Al and skin materials of an Al-Si system or an Al-Si-Mg system to be clad on both the surfaces of said core material
comprising the steps of:

(1) hot rolling the combined said core material and said skin materials which are laid on the both the surfaces of the core material after or without heating said core material at a temperature of 580° C. or below for homogenization, and (2) conducting cold rollings and intermediate full annealings to obtain a final cold rolled brazing sheet, in such a way that
 (a) two or more intermediate full annealings are carried out, and
 (b) said cold rollings are carried out in such rolling reduction ratios that a cold rolling reduction ratio $R_1(\%)$ of from the second last intermediate full annealing to the last intermediate full annealing and another cold rolling reduction ratio $R_2(\%)$ of from the last intermediate full annealing to the last thickness of said clad material satisfy the following relationship:

$$70 \leq R_1 \text{ and } 10 \leq R_2 \leq 50.$$

This embodiment will be hereinafter referred to as the second method.

According to this embodiment, the Fe element can be used in an amount in excess of 0.3%, which fact can reduce a material cost. Therefore, it is fair to say that this technique is very important. The second method permits employing the Fe element in an amount up to 0.8% without deteriorating the high-temperature sagging resistance. If the amount of Fe exceeds 0.8%, the amount of crystallized material which acts as a nuclei site of recrystallization increases, so that the high temperature sagging resistance of the plate is lowered due to the fine crystalline grains which are formed from the crystallized material at the time of brazing at high temperature. In addition, the excess amount of Fe causes deterioration of the moldability of the plate. Therefore the amount of Fe should be 0.8% or less. The function of Si and the reason for the restriction on its amount are the same as in the first method, but when the amount of Si is less than 0.05%, its functional effect is insufficient.

In this second method, except for the above point, the function of the elements to be added and the reason for the restriction on their amounts are the same as in the first method.

Examples of the Al-Si system and Al-Si-Mg system brazing materials, as the skin materials, used in this invention (the first and second methods) includes JIS A4343 (Al-7.4% Si), A4045 (Al-10% Si), these alloys containing about 1% of Zn, A4004 (Al-10% Si-1.5% Mg) and A4104 (Al-10% Si-1.5% Mg-0.1% Bi).

The clad material in this invention is most preferably composed of the core material and the skin material with which the core material is clad on both the surfaces thereof, but it may be the combination of the core material and the skin material clad on either side of the core material.

In this invention, the homogenizing treatment is optional and may be carried out on the core material prior to laying the skin material or on the core material after the laying. In this invention, only by cladding the core material with the skin material without homogenizing, desired properties can be obtained to a satisfactory degree. With regard to a temperature for the homogenizing treatment, its upper limit should be 580° C., because when the temperature for the treatment is more than 580° C., the recrystallization at the time of brazing provides fine grains, so that the high-temperature sagging resistance declines. It is to be noted that when the homogenizing treatment is carried out after the coating with the skin material, the treatment temperature must be less than a melting point of the skin material (melting points of Al-Si system and Al-Si-Mg system are 577° C. and 555° C., respectively).

Now, reference will be made to successive steps in which a thin plate is formed by rolling and thermally treating the above clad material.

First the combined material is heated up to a certain temperature below a melting point of the skin material, and then subjected to hot rolling. Conditions of these steps are not particularly limited. In the case that the homogenizing treatment follows the laying of the skin material, the hot rolling may be carried out immediately after the above homogenization.

Instantly after the hot rolling, or after the cold rolling, the intermediate full annealing is carried out. In this case, at least two intermediate full annealing steps are necessary to heighten the high-temperature sagging resistance. The intermediate full annealing means an intermediate annealing which is carried out at a temperature higher than the recrystallization temperature of the core material. Temperature and time for the intermediate full annealing are not particularly limited. The intermediate full annealing is preferably carried out at a temperature in the range of 300° to 450° C. and a time in the range of 0.5 to 6 hours.

The reason why the conditions of the intermediate full annealing and cold rolling are restricted in this invention is as follows:

In general, it is considered that the high-temperature sagging of the aluminum alloy fin material is caused by the fact that the melted skin material diffuses through grain boundaries or subboundaries of the core material Therefore, in order to prevent the diffusion of the skin material, it is necessary to recrystallize (eliminate the subboundaries) the core material promptly under high-temperature conditions of brazing and to form coarse recrystallized grains (to decrease the area of the grain boundaries).

Researches of the inventors have found that in the high-temperature brazing step, the greatest cause for the delay of the recrystallization is that dissolved elements such as Mn, Si and Fe precipitate during rising the temperature, and in short the recrystallization and the precipitation compete with each other. For the prevention of such a phenomenon, it is effective that after the hot rolling, the cold rolling and the intermediate full annealing are repeated in order to previously precipitate the elements sufficiently in the matrix and to thereby decrease amounts of the dissolved Mn, Si and Fe. The fine precipitates of these elements which have already been present before the high-temperature heating step do not pose any problem usually, though delaying the recrystallization slightly. Rather, these precipitates have the function of contributing to the formation of the coarse grains in order to build up the high-temperature sagging resistance. In order to obtain the above effect of decreasing the amounts of the dissolved Mn, Si and Fe, at least two intermediate full annealing steps are required. When the intermediate full annealing treatment is one step, the effect is insufficient.

In the first method, when the cold rolling reduction ratio ($R_1$) of from the second last intermediate full annealing to the last intermediate full annealing is less than 10%, the precipitation of the elements at the last annealing is insufficient and any recrystallization do not occur, so that the subboundaries tend to remain in the process of the high-temperature brazing. When the ratio ($R_1$) is in excess of 90%, the recrystallization at the last annealing step is extremely prompt, so that the very fine precipitate grains are formed, with the result that the subboundaries are prevented from vanishing at the brazing in order to weaken the high-temperature sagging resistance.

Further, when the final cold rolling reduction ratio ($R_2$) is less than 10%, reduction ratio is not sufficient and the recrystallization at brazing delays, so that the subboundaries remain, with the result that the high-temperature sagging resistance becomes poor. Inversely when the ratio ($R_2$) is in excess of 60%, the recrystallized grains become fine, so that the high-temperature sagging resistance lowers and a moldability as the fin material deteriorates.

In view of these problems, the requirements of $10 \leq R_1 \leq 90$ and $10 \leq R_2 \leq 60$ are necessary. In addition, in the range of $10 \leq R_2 \leq 20$, high-temperature sagging resistance is deteriorated on occasion, even if the relation of $10 \leq R_1 \leq 90$ is satisfied. Therefore, it is necessary to additionally add, to the above requirements, the relations of $30 \leq (R_1 + R_2)$ and $R_1 - R_2) \leq 60$ (See FIG. 1).

In the second method, when the cold rolling reduction ratio ($R_1$) of from the second last intermediate full annealing to the last intermediate full annealing is less than 70%, the precipitation of Fe is insufficient and Fe precipitates along with Mn in the high-temperature brazing step, so that subboundaries are liable to remain. Therefore, between the second last intermediate full 5 annealing and the last intermediate full annealing, the cold rolling step is needful the reduction ratio ($R_1$) of which is 70% or more. In this case, the higher the reduction ratio is, the higher the high-temperature sagging resistance is.

Further, in the second method, when a cold rolling reduction ratio ($R_2$) of from the last intermediate full annealing to the last plate thickness is less than 10%, reduction ratio is not sufficient and the recrystallization in the brazing step delays, so that the subboundaries remain, with the result that the high-temperature sagging resistance becomes low. Inversely when the last cold rolling reduction ratio ($R_2$) is in excess of 50%, the recrystallized grains become fine, so that the high-temperature sagging resistance becomes low and a moldability as the fin material deteriorates.

In view of the problems, the requirements of $70 \leq R_1$ and $10 \leq R_2 \leq 50$ are necessary.

In the most preferable aluminum thin plate for brazing obtained by this invention, the core material having the composition as described above and prepared by the first method is composed of an aluminum alloy plate in which, as metallographic structure, intermetallic compounds having a particle diameter of 0.1 to 0.3 μm are contained in the proportion of 0.5 to 5 vol %. This reason is as follows:

Causes from which the fin material sags under the high-temperature heating conditions in the brazing step can be classified roughly into the following three:

(1) The high-temperature strength of the fin material itself is poor.

(2) The fine recrystallized grains are formed at the time of heating, and Si in the skin material diffuses into grain boundaries and liquid phases occur in these boundaries.

(3) Subgrain structures and cells formed by dislocation remain at the time of heating, and Si in the skin material diffuses The poor strength which is the cause (1) can be eliminated by adding, to the alloy composition, a high-temperature strength-improving metal such as Mn, Zr or Cr.

The formation of the fine recrystallized grains and subgrains which are the above causes (1) and (2) derives from manufacturing process conditions (heat treatment, rolling and the like) of alloy plates. That is, the fin material having the above mentioned alloy composition includes intermetallic compounds containing Mn (Fe and Si) in the form of a crystallized material or a precipitate, though its distribution varies with its manufacturing steps. The inventors of this application have found from intensive investigations that, of these intermetallic compounds, ones having a large size are about 3 μm or more) become nuclei of the recrystallization in the high-temperature brazing step and that when many intermetallic compounds having the large size are present, the number of the recrystallization nuclei increases, so that the fine crystalline grains are obtained. This corresponds to the above mentioned cause (2) by which the high temperature sagging phenomenon occurs. Therefore, the fin material containing such intermetallic compounds has low high-temperature sagging resistance. That is the reason why the quantitative lower limit of the intermetallic compounds having a particle diameter of 0.1 to 0.3 μm is set to a level of 0.5 vol %. This theory will be further described in detail.

The large-size intermetallic compounds are either crystallized phases scissored by rolling or coarse precipitates. With regard to the former crystallized phases, the deterioration in the high-temperature sagging resistance can be inhibited by deciding the upper limit of the alloy composition, particularly the Fe component, as described above. An amount of the latter coarse precipitates is reversely proportional to an amount of the intermetallic compounds having a particle diameter of 0.1 to 0.3 μm. That is, the greater the amount of the coarse precipitates is, the smaller the amount of the fine grains having a diameter of 0.1 to 0.3 μm is. In consequence, when the intermetallic compounds having a particle diameter of 0.1 to 0.3 μm are present in an amount of 0.5 vol % or more, the precipitates are not sufficiently coarse, and it is possible to obtain the condition that the precipitates which are so coarse as to lower the high-temperature sagging resistance are not present.

To the contrary, when the fine intermetallic compounds are present in an excessive amount, the above cause (3) occurs owing to dislocation and pinning up grain of the intermetallic compounds having a particle diameter of 0.1 to 0.3 μm should be at a level of 5 vol % or less.

Heretofore, the relationship between the precipitated particles and the high-temperature sagging has not been elucidated, but the inventors of this case have made it clear that in the conventional fin material, the large-size intermetallic compounds (about 3 μm or more) are contained in quantities and the particles of 0.1 to 0.3 μm in diameter are contained in an amount of 0.5 vol % or less, so that the conventional fin material is prone to sag at a high temperature.

With regard to the aluminum thin plate for brazing of this invention, its final wall thickness is not particularly limited but is usually within the range of 0.10 to 0.20 mm.

According to this invention, the aluminum thin plates for brazing in which the high-temperature sagging resistance has been considerably enhanced than in the conventional one can be manufactured, whereby it is possible to render the fin material thinner. Further, according to this invention, the aluminum thin plates for brazing can be manufactured which are excellent in sacrificial anodic effect and which are eligible for non-corrosive flux brazing and carrier gas brazing.

In consequence, this invention permits providing thinner corrugated fins, lightening a heat exchanger, and reducing a manufacturing cost.

Now, this invention will be further described in detail on the basis of examples.

EXAMPLE 1(First Method)

Figure 1:
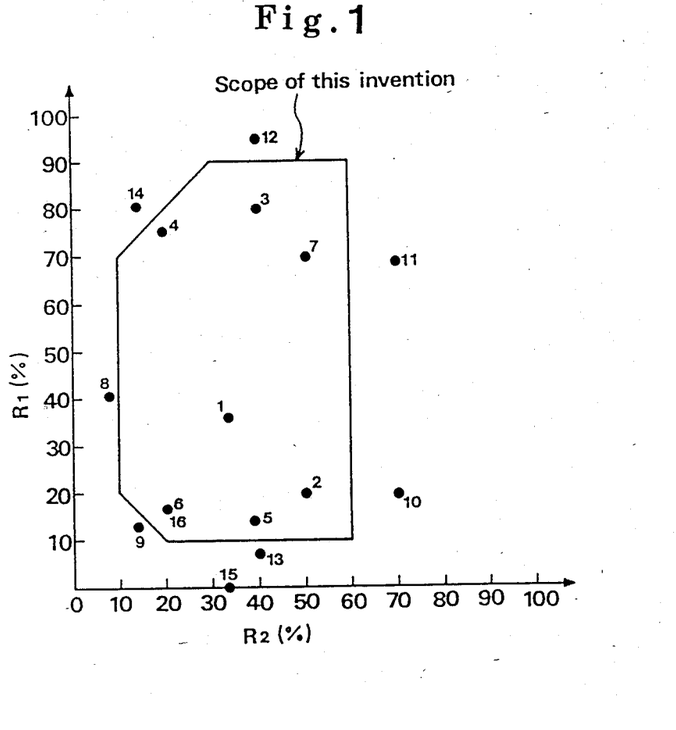
FIG. 1 is an explanatory view showing ranges of cold rolling reduction ratios which are employed in a method of this invention.

Ingots ($304^t \times 700^w \times 1,600^l$) having compositions A to D set forth in Table 1 were homogenized and scalped (some of the ingots were only scalped without being homogenized), and they were then combined on both the surfaces thereof with an Al-7.5% Si skin material corresponding to A4343 in a one-side cladding ratio of 12%. Afterward, as set forth in Table 2, re-heating, hot rolling, cold rolling and annealing were carried out to form brazing sheets for fins of 0.12 mm in thickness. Table 2 also sets forth detailed working procedures. Further, the working procedures Nos. 1 to 16 in Table 2 were plotted in FIG. 1. Numerals in FIG. 1 represent numbers of the respective working procedures, and the range satisfying the conditions of the first method was surrounded by a line.

TABLE 1

| Alloy No. | | Composition (%) | | | | | |
|---|---|---|---|---|---|---|---|
| | | Cu | Fe | Si | Mn | Mg | Zn | Al |
| This Invention | A | 0.11 | 0.18 | 0.22 | 0.74 | 0.11 | 0.96 | balance |
| | B | 0.10 | 0.10 | 0.15 | 1.52 | 0.04 | 1.30 | balance |
| Comparative Example | C | 0.03 | 0.25 | 0.62 | 1.00 | 0.02 | 0.85 | balance |
| | D | 0.08 | 0.50 | 0.41 | 1.15 | 0.03 | 1.10 | balance |

TABLE 2

| | Working Procedure This Invention | | | | | | |
|---|---|---|---|---|---|---|---|
| Step | 1 | 2 | 3 | 4 | 5 | 6 | 7 |
| Homogenization of Core Material | 550° C., 5 hours | | none | | 550° C., 5 hours | | |
| Re-heating | | | | | 520° C., 1 hour | | |
| Thickness after Hot Rolling | | | | | 4.5 mm | | |
| Thickness after Intermediate Annealing | 4.5 mm 0.28 mm 0.18 mm | 4.5 mm 0.30 mm 0.24 mm | 1.0 mm 0.2 mm | 0.6 mm 0.15 mm | 0.23 mm 0.14 mm | 0.18 mm 0.15 mm | 0.8 mm 0.24 mm |
| Number of Annealing | (three) | (three) | (two) | (two) | (two) | (two) | (two) |
| Conditions of Intermediate Annealing | | | | 360° C., 2 hours | | | |
| Final Thickness | | | | 0.12 mm | | | |
| $R_1$ | 36% | 20% | 80% | 75% | 39% | 17% | 70% |
| $R_2$ | 33% | 50% | 40% | 20% | 14% | 20% | 50% |

| | Working Procedure Comparative Example | | | | | | |
|---|---|---|---|---|---|---|---|
| Step | 8 | 9 | 10 | 11 | 12 | 13 | 14 |
| Homogenization of Core Material | | | 550° C., 5 hours | | | | 520° C., 5 hours |
| Re-heating | | | 520° C., 1 hour | | | | |
| Thickness after Hot Rolling | | | 4.5 mm | | | | |
| Thickness after Intermediate Annealing | 0.22 mm 0.13 mm | 0.16 mm 0.14 mm | 0.5 mm 0.4 mm | 2.0 mm 0.2 mm | 0.215 mm 0.2 mm | 0.18 mm | 0.18 mm 0.15 mm |
| Number of Annealing | (two) | (two) | (two) | (two) | (two) | (one) | (two) |
| Conditions of Intermediate Annealing | | | 360° C., 2 hours | | | | first, 240° C., 2 hours second, 360° C., 2 hours |
| Final Thickness | | | 0.12 mm | | | | |
| $R_1$ | 41% | 13% | 20% | 95% | 7% | — | 17% |
| $R_2$ | 8% | 14% | 70% | 40% | 40% | 33% | 20% |

The thus obtained fin materials were tested for high-temperature sagging resistance and corrosion resistance. The results are set forth in Table 3.

Figure 2:
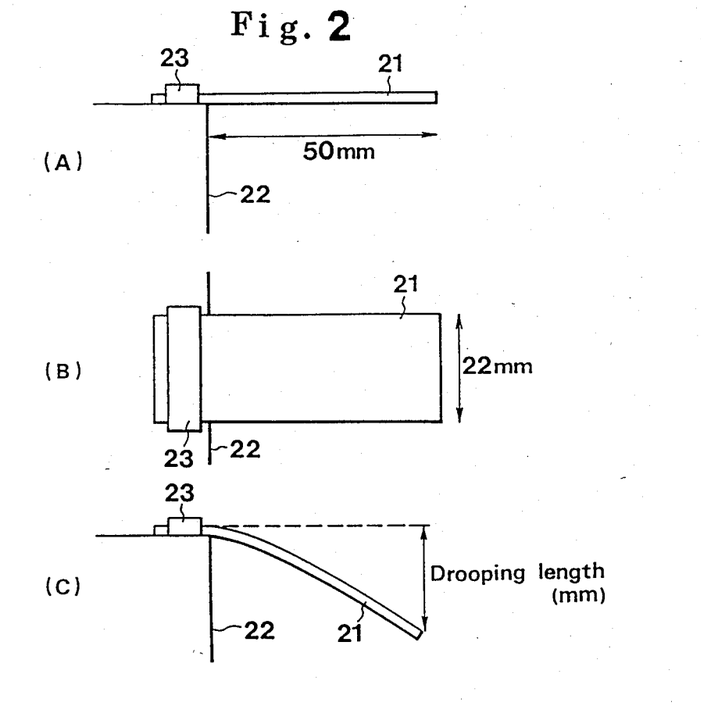
FIGS. 2(A), 2(B) and 2(C) are explanatory views showing a test procedure for the sagging resistance of a fin material.

(1) Test of high-temperature sagqing resistance:

From brazing sheets for fins which had been manufactured in accordance with the working procedures Nos. 1 to 16 by the use of alloys A to D as core materials, 22-mm-wide and 60-mm-long specimens 21 were prepared. As shown in FIGS. 2(a), 2(b) and 2(c), each specimen 21 (t×22$^w$×50$^l$) was supported on a base 22 by means of an open-side fixture 23, and it was heated at 610° C. for 10 minutes in the atmosphere. The high-temperature sagging resistance was evaluated on the basis of a drooping length after the heating which is shown in FIG. 2(c). It was confirmed that the fin having a drooping length of 15 mm or less in this evaluation way posed no problem when brazed.

Therefore, specimens having a drooping length of 15 mm or less were estimated to be good for sagging resistance.

Figure 3:
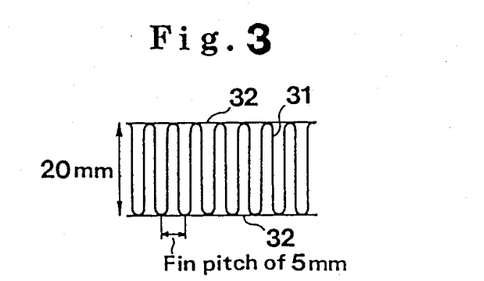
FIG. 3 is an explanatory view of a pitting corrosion resistance test.

(2) Corrosion resistance test of fin material:

As shown in FIG. 3, each fin material specimen 31 was corrugated and was then brazed on both the sides thereof with an A3003 plate 32 (0.8$^t$×20$^w$×100$^l$) with a non-corrosive flux comprising a mixture of potassium fluoaluminate complexes ($K_2AlF_2 \cdot H_2O$ and $KalF_4$)

This specimen 31 was then subjected to a saline solution spray test for 4,000 hours (in accordance with JIS (Japan Industrial Standard) Z2371), and a corrosion state on the A3003 plate was observed.

TABLE 3

|  | Alloy No. | Working Procedure | Drooping Length (mm) | Pitting Corrosion of Tube | Remarks |
| --- | --- | --- | --- | --- | --- |
| This Invention | A | 1 | 7.0 | 0.2 mm or less, no through-hole |  |
|  |  | 2 | 8.0 | 0.2 mm or less, no through-hole |  |
|  |  | 4 | 9.5 | 0.2 mm or less, no through-hole |  |
|  |  | 7 | 7.0 | 0.2 mm or less, no through-hole |  |
|  | B | 1 | 7.5 | 0.2 mm or less, no through-hole |  |
|  |  | 5 | 10.0 | 0.2 mm or less, no through-hole |  |
|  |  | 6 | 12 | 0.2 mm or less, no through-hole |  |
| Comparison | A | 8 | 20 | 0.2 mm or less, no through-hole |  |
|  |  | 11 | 25 | 0.2 mm less, no through-hole |  |
|  |  | 13 | 48 | 0.2 mm or less, no through-hole |  |
|  |  | 14 | 31 | 0.2 mm or less, no through-hole |  |
|  | B | 9 | 22 | 0.2 mm or less, no through-hole |  |
|  |  | 12 | 19 | 0.2 mm or less, no through-hole |  |
|  | C | 1 | 21 | 0.2 mm or less, no through-hole |  |
|  |  | 2 | 25 | 0.2 mm or less, no through-hole |  |
|  |  | 5 | 30 | 0.2 mm or less, no through-hole |  |
|  |  | 13 | 42 | 0.2 mm or less, no through-hole |  |
|  | D | 3 | 18 | 0.2 mm or less, no through-hole |  |
|  |  | 4 | 21 | 0.2 mm or less, no through-hole |  |
|  |  | 8 | 31 | 0.2 mm or less, no through-hole |  |

TABLE 3-continued

| Alloy No. | Working Procedure | Drooping Length (mm) | Pitting Corrosion of Tube | Remarks |
|---|---|---|---|---|
| | 10 | 37 | 0.2 mm or less, no through-hole | not moldable |
| | 12 | 30 | 0.2 mm or less, no through-hole | |
| | 13 | 45 | 0.2 mm or less, no through-hole | |

As is apparent from Table 3, the drooping length of every specimen regarding this invention was 15 mm or less and therefore was recognized to be excellent in high-temperature sagging resistance. Further, the pitting 5 corrosion on the brazed specimens regarding this invention was 0.2 mm or less in depth and any through-hole was not present, which fact was indicative that they were excellent in corrosion resistance. On the contrary, the specimens all regarding comparative compositions and/or comparative treatments had a hanging length of 15 mm or more and therefore were recognized to be bad in high-temperature sagging resistance, though the pitting corrosion resistance was confirmed.

EXAMPLE 2 (Second Method)

Ingots (thickness 304 mm, width 700 mm and length 1,600 mm) having compositions A to E set forth in Table 4 were homogenized (some of the ingots were untreated) and scalped, and they were then clad on both the surfaces thereof with Al-7.5% Si skin materials corresponding to A4343 in a one-side cladding ratio of 12%. Afterward, re-heating, hot rolling, cold rolling and annealing were carried out under conditions set forth in Table 5 in order to form aluminum thin plates for brazing of 0.16 mm in last thickness. Of these thin plate specimens, ones regarding the method of this invention were named example specimens and ones regarding alloy compositions and/or treatment conditions other than in this invention were named comparative specimens.

The thus obtained specimens were tested for 5 high-temperature sagging resistance and corrosion resistance in the same manner as in Example 1. The results are set forth in Table 6.

TABLE 4

| | Alloy No. | Composition (wt %) | | | | | | |
|---|---|---|---|---|---|---|---|---|
| | | Cu | Fe | Si | Mn | Mg | Zn | Al |
| This Invention | A | 0.13 | 0.60 | 0.32 | 0.94 | 0.01 | 1.11 | balance |
| | B | 0.15 | 0.64 | 0.23 | 1.14 | 0.01 | 1.84 | balance |
| | C | 0.10 | 0.35 | 0.38 | 1.53 | 0.02 | 1.03 | balance |
| Comparison | D | 0.14 | 0.93 | 0.49 | 1.03 | 0.00 | 1.11 | balance |
| | E | 0.08 | 0.39 | 0.65 | 1.23 | 0.01 | 1.10 | balance |

TABLE 5

| | This Invention | | | | Comparison | | | |
|---|---|---|---|---|---|---|---|---|
| Steps | Working Test No. | | | | | | | |
| | 1 | 2 | 3 | 4 | 5 | 6 | 7 | 8 |
| Homgenization of Core Material (550° C., 5 hr) | done | not done | done | | | done | | |
| Cladding (skin material 12% on both surfaces) | done | done | done | | | done | | |
| Re-heating (520° C., 1 hr) | done | done | done | | | done | | |
| Hot Rolling Thickness (mm) | 3.5 | 3.5 | 3.5 | | | 3.5 | | |
| Cold Rolling Reduction Ratio (%) | not done | 81 | 77 | 61 | 71 | 66 | 94 | 81 |
| Cold Rolling Thickness (mm) | | 0.67 | 0.82 | 1.35 | 1.0 | 1.20 | 0.21 | 0.67 |
| 1 Intermdediate Annealing | 360° C., 2 hr | 360° C., 2 hr | 360° C., 2 hr | | 360° C., 2 hr | | | 240° C., 2 hr |
| Cold Rolling Reduction Ratio (%) | 81 | 70 | 70 | 79 | 83 | 58 | not done | 70 |
| Cold Rolling Thickness (mm) | 0.67 | 0.20 | 0.25 | 0.29 | 0.17 | 0.50 | | 0.20 |
| 2 Intermediate Annealing | 360° C., 2 hr | 360° C., 2 hr | 360° C., 2 hr | | 360° C., 2 hr | | not done | 360° C., 2 hr |
| Cold Rolling Reduction Ratio (%) | 70 | not done | not done | | | | not done | |
| Cold Rolling Thickness (mm) | 0.20 | | | | | | | |
| 3 Intermediate Annealing | 360° C., 2 hr | not done | not done | | | | not done | |
| Last Cold Rolling Reduction Ratio (%) | 20 | 20 | 36 | 45 | 6 | 68 | 24 | 20 |
| Last Cold Rolling Thickness (mm) | 0.16 | 0.16 | 0.16 | | | | 0.16 | |

TABLE 6

| | Alloy No. | Test No. | Drooping Length (mm) | Pitting Corrosion of Tube | Remarks |
|---|---|---|---|---|---|
| This Invention | A | 1 | 5.0 | 0.2 mm or less, no through-hole | |
| | | 2 | 5.5 | 0.2 mm or less, no through-hole | |
| | | 3 | 7.0 | 0.2 mm or less, no through-hole | |
| | | 4 | 10.5 | 0.2 mm or | |

TABLE 6-continued

| | Alloy No. | Test No. | Drooping Length (mm) | Pitting Corrosion of Tube | Remarks |
|---|---|---|---|---|---|
| | B | 2 | 4.5 | 0.2 mm or less, no through-hole | |
| | | 3 | 9.0 | 0.2 mm or less, no through-hole | |
| | C | 1 | 5.5 | 0.2 mm or less, no through-hole | |
| | | 2 | 4.0 | 0.2 mm or less, no through-hole | |
| | | 4 | 12.0 | 0.2 mm or less, no through-hole | |
| Comparison | A | 5 | 19.0 | 0.2 mm or less, no through hole | |
| | | 6 | 47.0 | 0.2 mm or less, no through hole | not moldable |
| | | 7 | 21.0 | 0.2 mm or less, no through hole | |
| | | 8 | 22.0 | 0.2 mm or less, no through hole | |
| | B | 6 | 43.0 | 0.2 mm or less, no through hole | not moldable |
| | | 7 | 25.0 | 0.2 mm or less, no through hole | |
| | | 8 | 25.0 | 0.2 mm or less, no through hole | |
| | C | 5 | 18.0 | 0.2 mm or less, no through hole | |
| | D | 1 | 21.0 | 0.2 mm or less, no through hole | |
| | | 2 | 18.0 | 0.2 mm or less, no through hole | |
| | | 3 | 19.0 | 0.2 mm or less, no through hole | |
| | | 5 | 38.0 | 0.2 mm or less, no through hole | |
| | | 6 | 48.0 | 0.2 mm or less, no through hole | not moldable |
| | | 7 | 32.0 | 0.2 mm or less, no through hole | |
| | E | 1 | 18.0 | 0.2 mm or less, no through hole | |
| | | 2 | 16.0 | 0.2 mm or less, no through hole | |
| | | 3 | 20.0 | 0.2 mm or less, no through hole | |

As is apparent from Table 6, the drooping length of every specimen regarding this invention was 15 mm or less and therefore was recognized to be excellent in high-temperature sagging resistance. Further, a pitting corrosion on the brazed specimens regarding this invention was 0.2 mm or less in depth and any through-hole was not present, which fact was indicative that they were excellent in corrosion resistance. On the contrary, the specimens all regarding comparative compositions and/or comparative manufacturing steps had a drooping length of 15 mm or more and therefore were recognized to be bad in high-temperature sagging resistance, though the corrosion resistance was confirmed. In addition, some of the comparative specimens were not moldable.

EXAMPLE 3

Ingots (thickness 70 mm, width 160 mm and length 600 mm) having compositions A to C set forth in Table 7 were each divided as needed, homogenized and scalped, and they were then clad on both the surfaces thereof with an Al-7.5% Si skin material in a one-side cladding ratio of 12%. Afterward, hot rolling was performed until a thickness of each material became 3 mm (under usual conditions), and was further divided as needed. Then, cold rolling and annealing followed in order to form specimens for fins of 0.12 mm in thickness. Table 8 sets forth manufacturing conditions for the homogenization, cold rolling, annealing and the like of the specimens as well as metallographic volume ratios of intermetallic compounds having a particle diameter of 0.1 to 0.3 μm in the thus prepared fin specimens. After the removal of the skin material from each specimen by the use of aqua regia and then the treatment thereof at 500° C. for 10 seconds to eliminate strain therefrom, each volume ratio was measured by means of a transmission electron microscope. That is, a film thickness of each specimen was first decided by the use of fringes of equal thickness, and the total volume of the precipitated particles having 0.1 to 0.3 μm in a visual range was then sought by a picture treatment. Finally, the volume ratio was calculated in accordance with the following formula:

$$\text{Volume Percent} = \frac{\text{Total Volume}^{*1}}{\text{Film Thickness} \times \text{Area}^{*2}} \times 100$$

*1: The total volume of the grains having 0.1 to 0.3 μm in the visual range.
*2: The area of the visual range.

The 10 fin material specimens thus obtained were tested, in the same manner as in Example 1, for high-temperature sagging resistance and pitting corrosion resistance after the brazing of a cladding material.

The results are also set forth in Table 8.

TABLE 7

| Alloy No. | Composition (wt %) | | | | | | | | |
|---|---|---|---|---|---|---|---|---|---|
| | Cu | Fe | Si | Mn | Mg | Zn | Zr | Ti | Al |
| A | 0.12 | 0.23 | 0.26 | 1.45 | 0.10 | 1.14 | 0.00 | 0.01 | balance |
| B | 0.06 | 0.11 | 0.12 | 0.78 | 0.06 | 0.57 | 0.06 | 0.01 | balance |
| C (Comparative Alloy) | 0.05 | 0.91 | 0.43 | 1.72 | 0.04 | 0.97 | 0.01 | 0.01 | balance |

TABLE 8

| Alloy No. | Material Symbol | Conditions of Homogenization | Conditions of Cold Rolling and Annealing | Volume(1) Ratio (%) | Drooping Length (mm) | Pitting Corrosion of Tube | Remarks | |
|---|---|---|---|---|---|---|---|---|
| A | A1 | 520° C. × 3 hr | (2)cold rolling to t0.23 → 360° C. × 4 hr → cold rolling to t0.14 → 360° C. × 4 hr → cold rolling to t0.12 | 4.0 | 5 | 0.2 mm or less, no through hole | | This invention |
| | A2 | | cold rolling to t0.24 → 360° C. × 4 hr → cold rolling to 0.17 → 360° C. × 4 hr → cold rolling to t0.12 | 3.5 | 7 | 0.2 mm or less, no through hole | | This invention |
| A | A3 | 540° C. × 8 hr | cold rolling to t0.23 → 360° C. × 4 hr → cold rolling to t0.14 → 360° C. × 4 hr → cold rolling to t0.12 | 2.0 | 6 | 0.2 mm or less, no through hole | | This invention |
| | A4 | | cold rolling to t0.14 → 360° C. × 2 hr → cold rolling to t0.12 | 7.0 | 24 | 0.2 mm or less, no through hole | | Comparison |
| A | A5 | 600° C. × 9 hr | cold rolling to t0.17 → 360° C. × 2 hr → cold rolling to t0.12 | 0.2 | 48 | 0.2 mm or less no through hole | | Conventional Example |
| B | B1 | 550° C. × 3 hr | cold rolling to t0.23 → 360° C. × 4 hr → cold rolling to t0.14 → 360° C. × 4 hr → cold rolling to t0.12 | 0.9 | 7 | 0.2 mm or less, no through hole | | This invention |
| | B2 | | cold rolling to t0.24 → 360° C. × 4 hr → cold rolling to t0.17 → 360° C. × 4 hr → cold rolling to t0.12 | 1.5 | 11 | 0.2 mm or less, no through hole | | |
| B | B3 | 600° C. × 9 hr | cold rolling to t017 → 360° C. × 4 hr → cold rolling to t0.12 | 0.1 | 45 | 0.2 mm or less, no through hole | | Conventional Example |
| C | C1 | 520° C. × 3 hr | cold rolling to t0.23 → 360° C. × 4 hr → cold rolling to t0.14 → 400° C. × 4 hr → cold rolling to t0.12 | 11.0 | 38 | 0.2 mm or less, no through hole | not moldable | Comparison |

Note:
(1)The item "volume ratio" represents a volume ratio of intermetallic compounds having a particle diameter of 0.1 to 0.3 μm.
(2)The alphabet "t" represents a thickness.

As is apparent from Table 8, the fin materials regarding this invention were 15 mm or less in drooping length in spite of being as thin as 0.12 mm, which level was thinner than the usual fin materials, and therefore they were recognized to be excellent in high-temperature sagging resistance. Further, the pitting corrosion on the brazed tube materials regarding this invention was 0.2 mm or less in depth and any through-hole was not present, which fact was indicative that they were excellent in pitting corrosion resistance. On the contrary, the specimens all regarding comparative specimens had a drooping length of 15 mm or more and therefore were recognized to be bad in high-temperature sagging resistance, though the pitting corrosion resistance was confirmed. In addition, some of the comparative specimens were not moldable.

Having described our invention as related to the embodiment, it is our intention that the invention be not limited by any of the details of the description, unless otherwise specified, but rather be construed broadly within its spirit and scope as set out in the accompanying claims.

What we claim is:

1. A method for preparing composite brazing sheets for fins of heat exchangers from an aluminum alloy core material comprising 0.6 to 2.0 wt % of Mn, 0.3 wt % or less of Fe, 0.05 to 0.6 wt % of Si, 0.5 to 2.0 wt % of Zn, 0.05 to 0.2 wt % of Cu and a balance of Al, and skin materials of an Al-Si system or an Al-Si-Mg system to be clad on both the surfaces of the core material comprising the steps of
   (1) hot rolling the combined said core material and said skin materials which are laid on the both surfaces of the core material after or without heating said core material at a temperature of 580° C. or below for homogenization, and
   (2) conducting cold rollings and intermediate full annealings to obtain a final cold rolled brazing sheet, wherein
      (a) at least two intermediate full annealings are carried out, and
      (b) said cold rollings are carried out in such rolling reduction ratios that a cold rolling reduction ratio $R_1(\%)$ of from the second last intermediate full annealing to the last intermediate full annealing and another cold rolling reduction ratio $R_2(\%)$ of from the last intermediate full annealing to the last thickness of said clad material satisfy the following relationship:

$$10 \leq R_1 \leq 90 \text{ and } 10 \leq R_2 \leq 60, \text{ and}$$

$$30 \leq (R_2 + R_2) \text{ and } (R_1 - R_2) \leq 60.$$

2. The method as claimed in claim 1, wherein the intermediate full annealing is carried out at a temperature in the range of 300° to 450° C.

3. A method for preparing composite brazing sheets for fins of heat exchangers from an aluminum alloy core material comprising 0.6 to 2.0 wt % of Mn, 0.31 to 0.80 wt % of Fe, 0.05 to 0.6 wt % of Si, 0.5 to 2.0 wt % of Zn, 0.05 to 0.2 wt % of Cu and a balance of Al and skin materials of an Al-Si system or an Al-Si-Mg system to be clad on both the surfaces of said core material
   comprising the steps of
   (1) hot rolling the combined said core material and said skin materials which are laid on the both the surfaces of the core material after or without heating said core material at a temperature of 580° C. or below for homogenization, and
   (2) conducting cold rollings and intermediate full annealings to obtain a final cold rolled brazing sheet, in such a way that
      (a) two or more intermediate full annealings are carried out, and
      (b) said cold rollings are carried out in such rolling reduction ratios that a cold rolling reduction ratio $R_1(\%)$ of from the second last intermediate full annealing to the last intermediate full annealing and another cold rolling reduction ratio $R_2(\%)$ of from the last intermediate full annealing to the last thickness of said clad material satisfy the following relationship:

$$70 \leq R_1 \text{ and } 10 \leq 10 \leq R_2 \leq 50.$$

4. The method as claimed in claim 3, wherein the intermediate full annealing is carried out at a temperature in the range of 300° to 450° C.

5. Composite braising sheets for fins of heat exchangers composed of an aluminum alloy as a core material and skin materials with which said core material is clad on both the surfaces thereof in which said skin material being composed of an Al-Si system or an Al-Si-Mg system and said core material is composed of 0.3 wt % or less of Fe. 0.05 to 0.6 wt % of Si, 0.5 to 2.0 wt % of Zn, 0.6 to 2.0 wt % of Mn, 0.05 to 0.2 wt % of Cu, a balance of Al, and 0.5 to 5 vol % of intermetallic compounds having a particle diameter of 0.1 to 0.3 μm as metallographic structure.

* * * * *